April 1, 1930. A. E. F. MOONE 1,752,751
MACHINE FOR MAKING ROOFING AND THE LIKE
Filed July 23, 1927 6 Sheets-Sheet 1
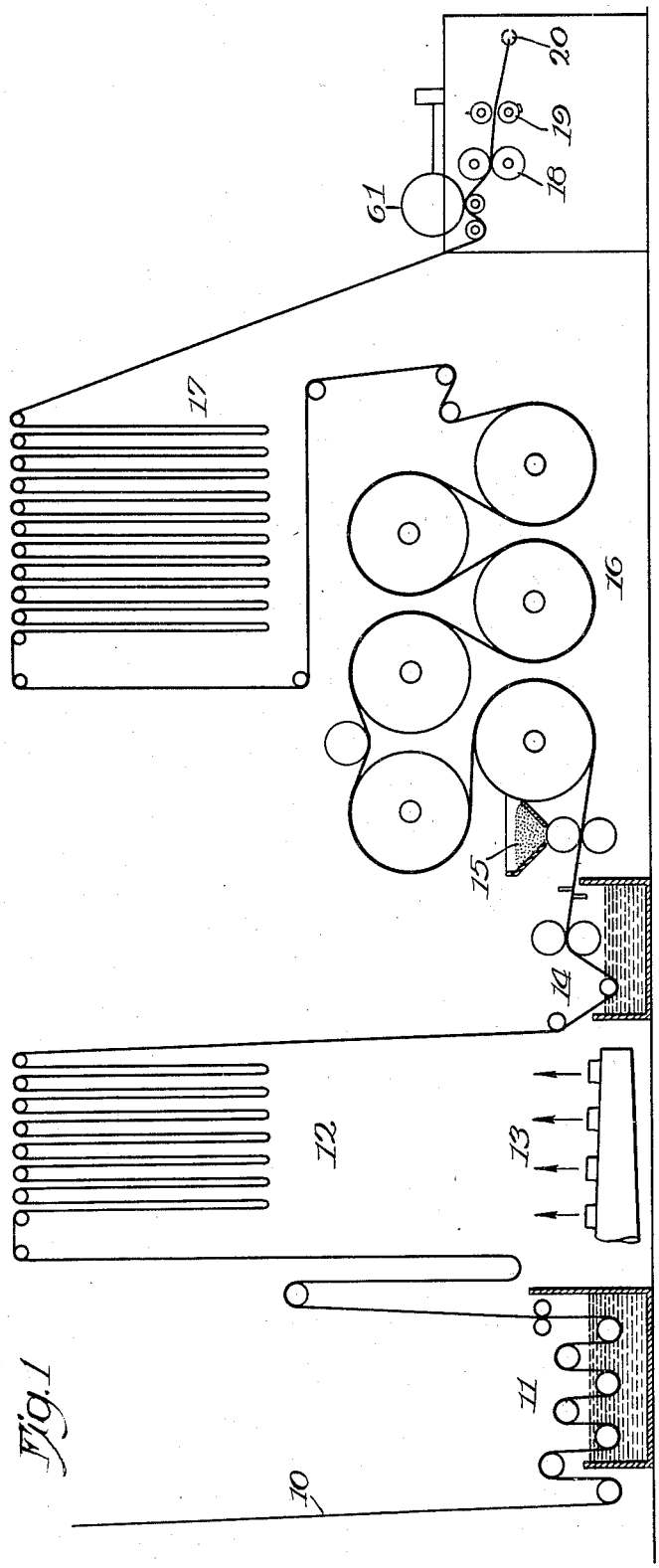
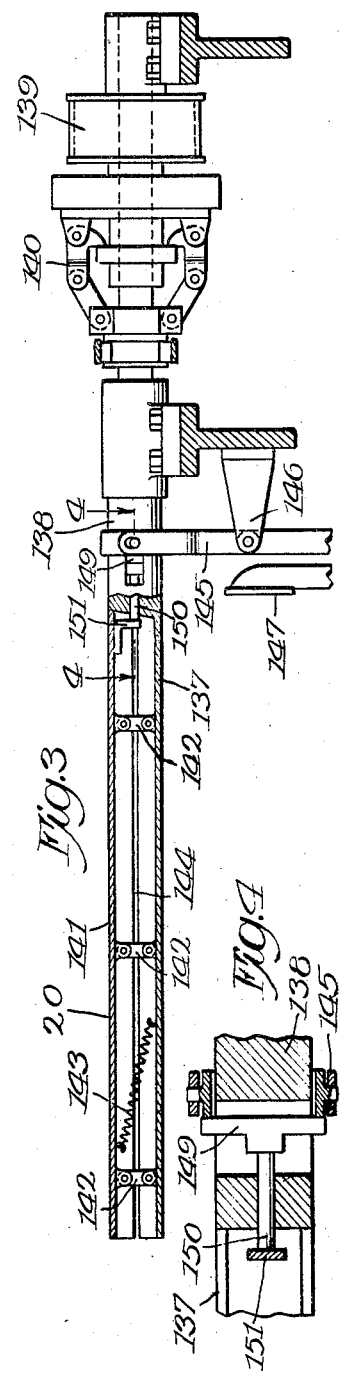
Inventor:
Albert E. F. Moone
By Wilson, Mann & Cox,
Attys.

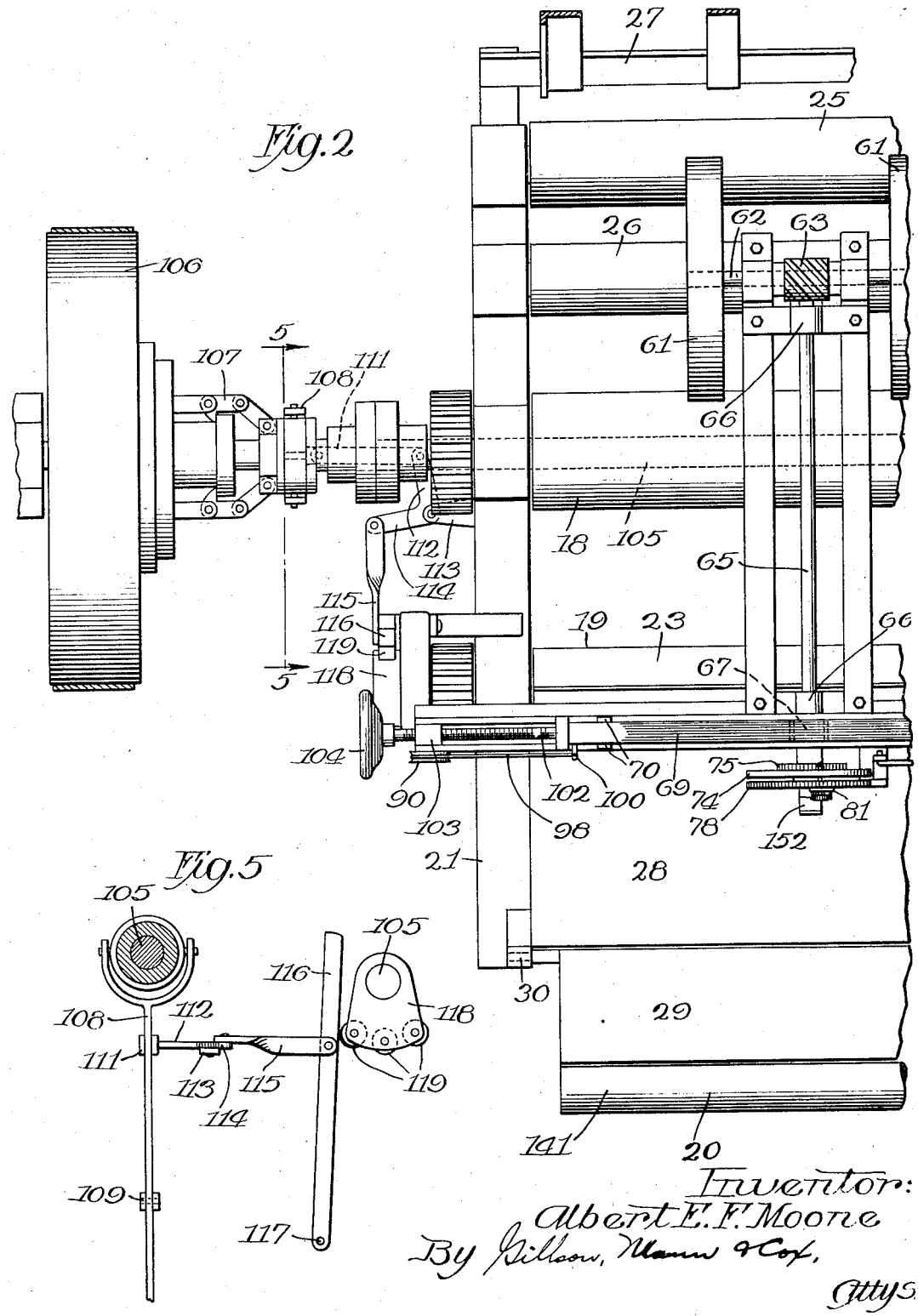

April 1, 1930. A. E. F. MOONE 1,752,751
MACHINE FOR MAKING ROOFING AND THE LIKE
Filed July 23, 1927 6 Sheets-Sheet 3
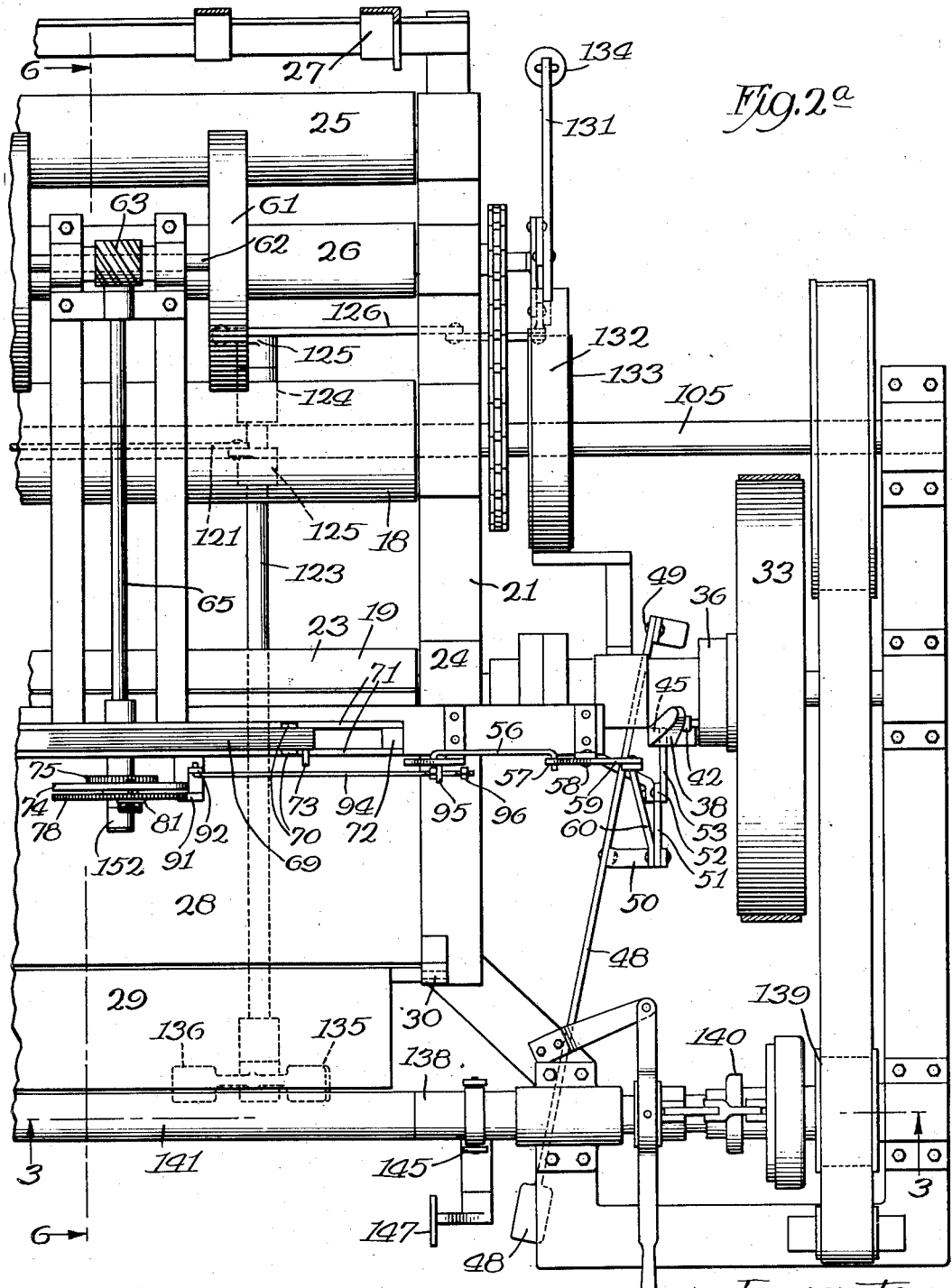
Fig. 2ª
Inventor:
Albert E. F. Moone
By Gillson, Mann & Cox, Attys.

April 1, 1930. A. E. F. MOONE 1,752,751
MACHINE FOR MAKING ROOFING AND THE LIKE
Filed July 23, 1927 6 Sheets-Sheet 4
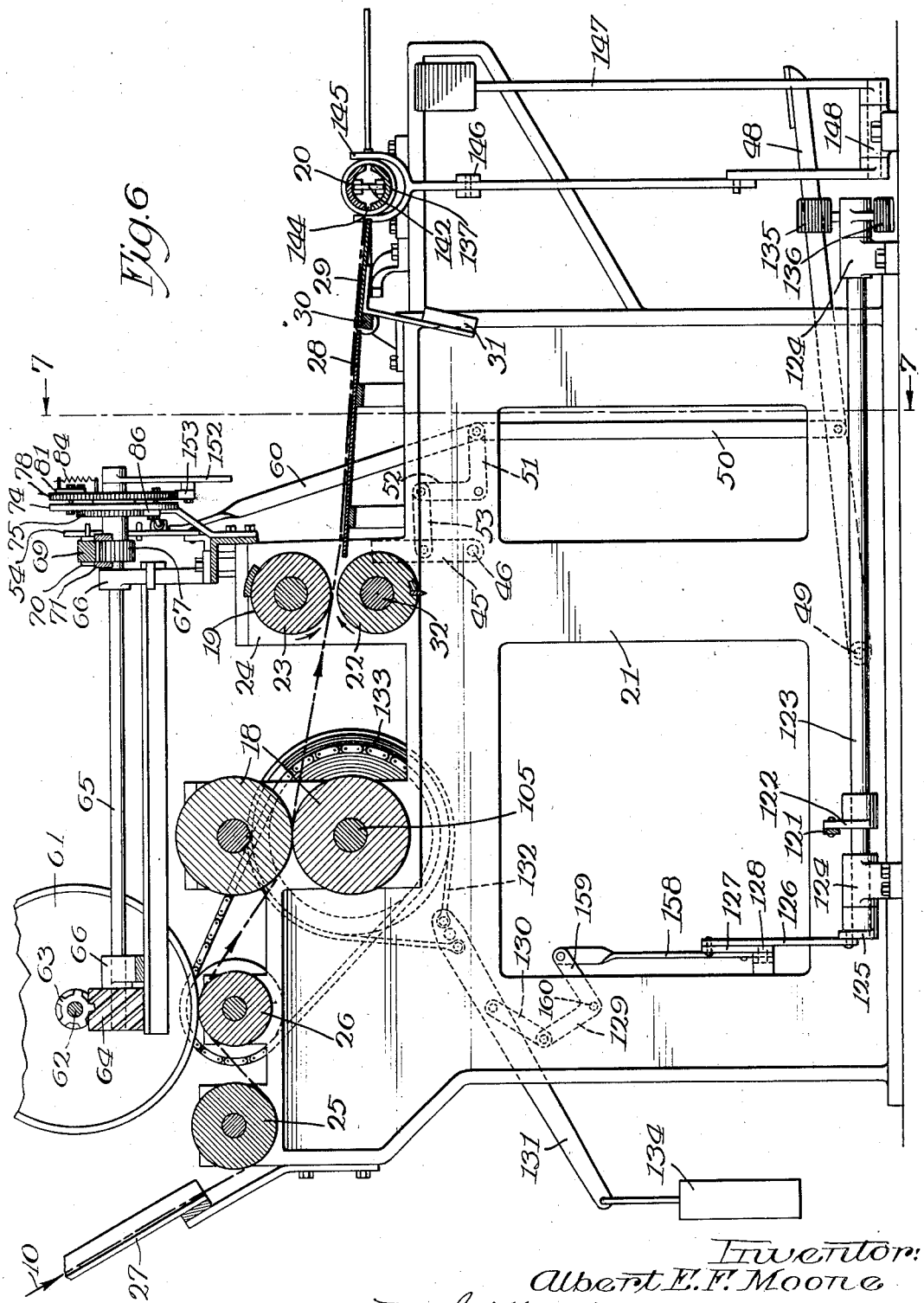

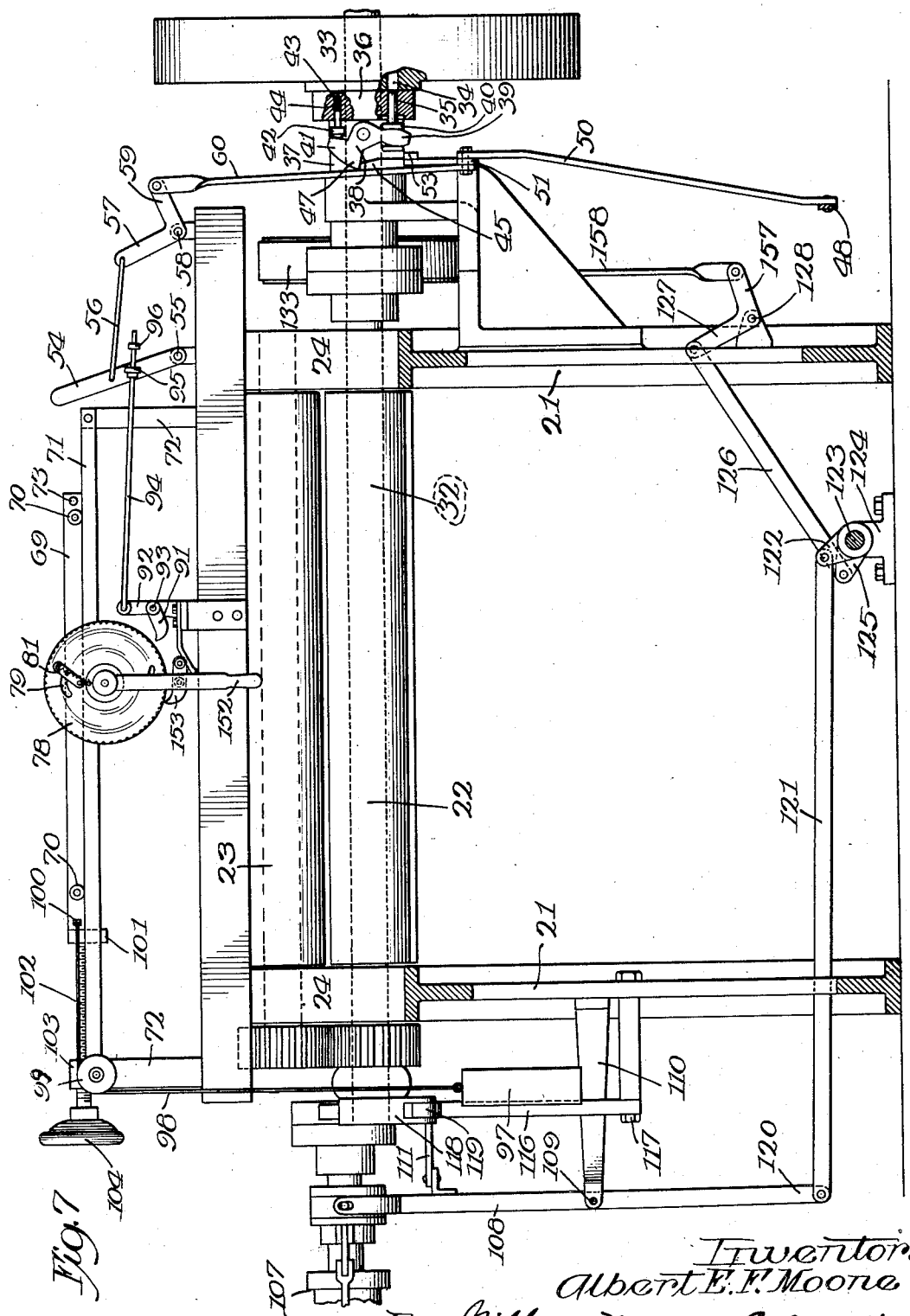

April 1, 1930.  A. E. F. MOONE  1,752,751
MACHINE FOR MAKING ROOFING AND THE LIKE
Filed July 23, 1927   6 Sheets-Sheet 6
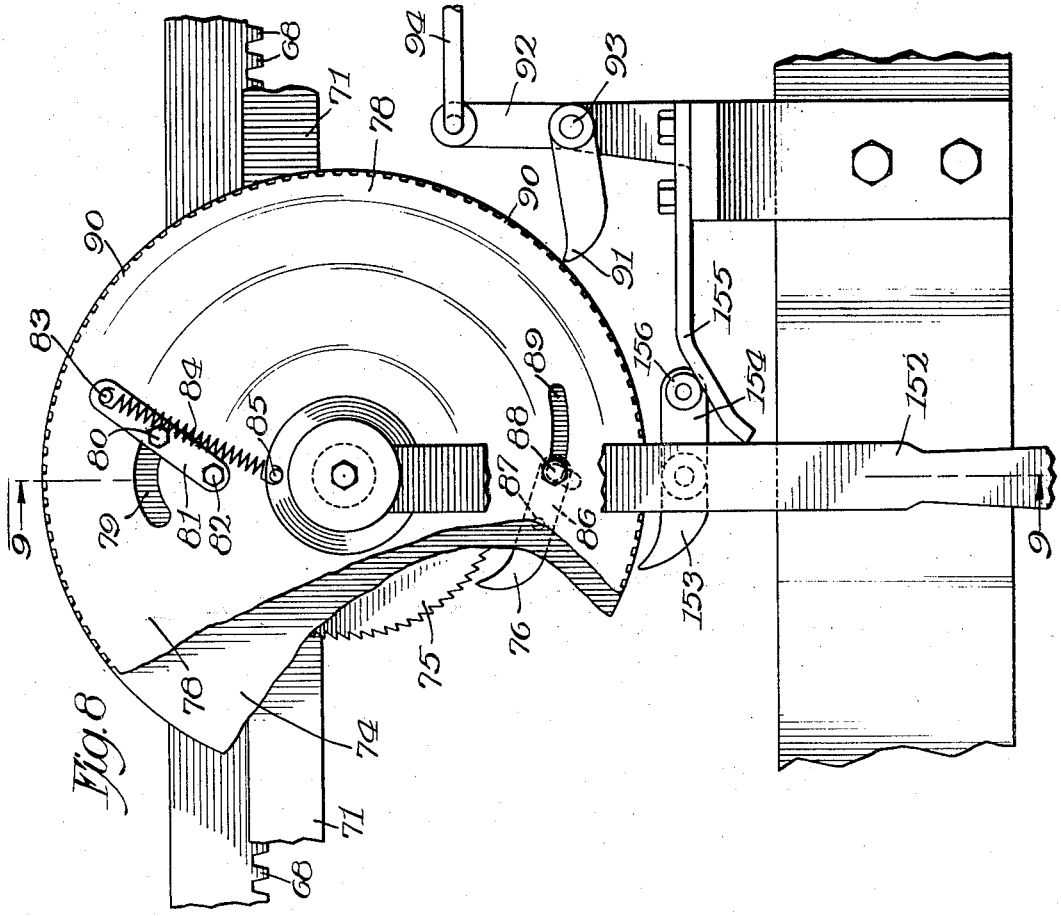
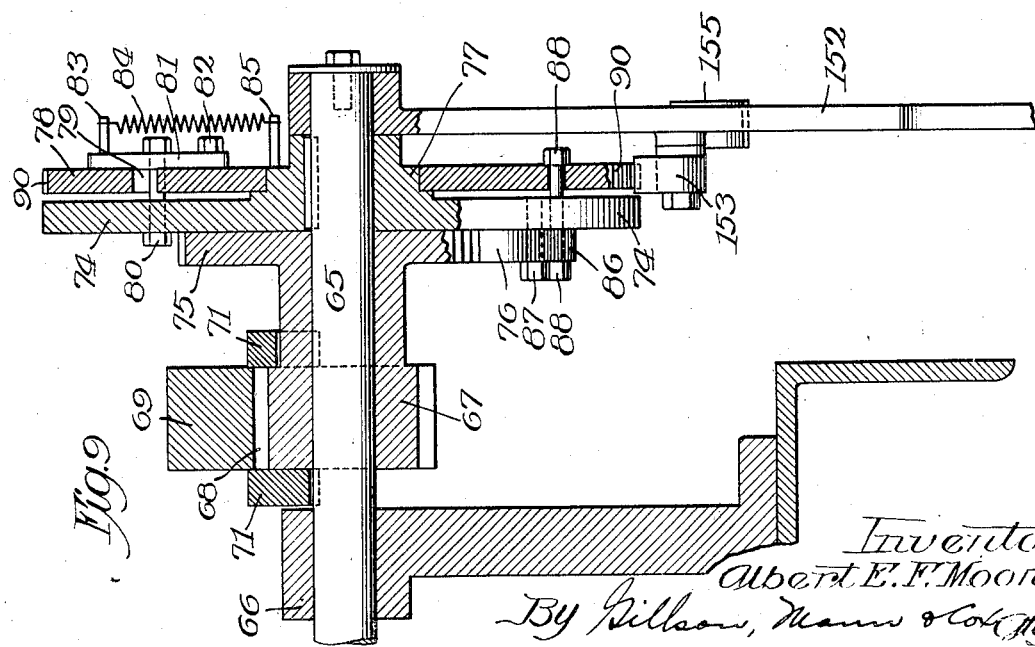
Inventor.
Albert E. F. Moone Patented Apr. 1, 1930

1,752,751

UNITED STATES PATENT OFFICE

ALBERT E. F. MOONE, OF CHICAGO, ILLINOIS, ASSIGNOR TO THE LEHON COMPANY, A CORPORATION OF ILLINOIS

MACHINE FOR MAKING ROOFING AND THE LIKE

Application filed July 23, 1927. Serial No. 207,993.

This invention relates to the manufacture of so-called roll roofing and the like and has for its principal objects to accurately control the quantities of material put in the roll, to eliminate the personal equation of the operator from the measuring operation, to automatically sever the sheet when a predetermined length has been fed, to automatically check the feed to permit the removal of a formed roll.

Further objects and advantages of the invention will become apparent as the disclosure proceeds and the description is read in connection with the accompanying drawings, in which Fig. 1 is a diagrammatical view illustrating the sequence of operations by which a continuous sheet of so-called felt is made into rolls of roofing;

Fig. 2 is a plan view of the left side of the machine embodying the invention;

Fig. 2ª is a similar plan view of the right side of the same machine;

Fig. 3 is a fragment of the machine illustrating the roll forming mechanism partly in vertical section;

Fig. 4 is a sectional view taken on the line 4—4 of Fig. 3;

Fig. 5 is a sectional view taken on the line 5—5 of Fig. 2;

Fig. 6 is a longitudinal vertical section taken on the line 6—6 of Fig. 2ª;

Fig. 7 is a sectional view taken on the line 7—7 of Fig. 6;

Fig. 8 is an enlarged fragment of the upper portion of Fig. 7, and

Fig. 9 is a vertical section taken on the line 9—9 of Fig. 8.

However, this specific illustration and the corresponding specific description are used solely for the purpose of making the disclosure full and clear and are not intended to impose limitations on the claims.

In Fig. 1, 10 indicates a sheet of felt which in the procedure of making roofing passes first through a saturater generally indicated at 11, thence it goes through a saturated loop, generally indicated at 12, being subjected the while to blasts issued from the header 13, thence it passes through a coater 14, thence under a grit hopper 15, thence through the cooling stack, generally indicated at 16, thence through the finished loop 17, from which it is drawn by pulling rolls 18 and fed past a cutter 19 to a roll forming mechanism 20. This invention has to do with the operations performed after the roofing leaves the finished loop, or other similar material is ready for cutting and rolling.

Referring now to Fig. 6 (which is a longitudinal section of a machine embodying the principles of this invention), 21 indicates a frame. The roll forming mechanism will be recognized at 20 near the extreme right. The cutter, including a knife-carrying roll 22, and an anvil roll 23, is mounted in upwardly extending arms 24 on the frame, located near the middle. To the left of the cutter are the feed rolls 18, arranged one above the other, as in the diagram shown in Fig. 1. To the left of the feed rolls are guide rolls 25 and 26 and to the left of the guide roll 25 is a downwardly inclined guide 27.

The path of the sheet 10 through the machine is indicated by the dot and dash line extending first along the guide 27 under the roll 25, over the roll 26, between the rolls 18, between the cutter roll and the anvil roll, then along a platform 28 to the roll forming cylinder 20.

The right end portion 29 of the platform 28 is hinged at 30 and normally held in the position shown by a counterweighted arm 31, but which may rotate to the right from the position shown in Fig. 6, as the roll builds up on the cylinder 20.

The shaft 32 (Fig. 7) of the knife-roll 22 is extended to one side, indicated at the right in Fig. 7, and receives a pulley 33 adapted to be continuously driven from any suitable source. The pulley is free to revolve on the shaft except when connected with it by a suitable clutch. As shown particularly in Fig. 7, the left side of the pulley is provided with openings 34 adapted to receive a rod 35 slidably mounted in a collar 36 fixed to the shaft 32. On an extension 37 of the same collar a lever 38 is pivoted and one end 39 of the lever is loosely received in the fork 40 on the rod 35, while the other end 41 is subjected to the thrust of a plunger 42 mounted in a recess 43 in the collar 36 and urged to the left in Fig. 7 by a spring 44.

The normal tendency of the parts just described is to effect a driving engagement between the pulley 33 and the shaft 32 and, hence, to operate the cutter. As a general rule, however, in the operation of this machine the cutter rolls will be required to make but a single revolution at intervals depending upon the size of the rolls to be formed and the speed with which the sheet is fed. Means are therefore provided to release the clutch after a single operation of the cutter. This office is performed by an arm 45 (Fig. 6) pivotally mounted at 46 on the frame 21 and normally having its upper end in position to engage the laterally extending shoulder 47 on the lever 38 (Fig. 7). As long as the arm 45 remains in this position the clutch will be released and the pulley 33 may rotate idly on the shaft 32.

The arm 45 may be rotated to the right in Fig. 6 to release the lever 47 and permit the clutch to engage by pressing downwardly on the pedal 48 fulcrumed at 49 on the frame and pivoted at an intermediate point to a link 50 which, in turn, is pivoted to one arm 51 of a bell crank, the other arm 52 of which is connected with the arm 45 by a link 53.

As a general rule, however, the clutch will be released automatically when a predetermined amount of the sheet has been fed. This is accomplished by a measuring device which, as the end of the selected measurement is approached, acts to move the lever 54 (Fig. 7) to the right. This lever is fulcrumed on the frame at 55 and connected by a link 56 with one arm 57 of the bell crank, fulcrumed at 58, and the other arm 59 of which is connected by a link 60 with the arm 51 (Fig. 6).

The measuring device here shown includes a roller 61 (Fig. 6) on a shaft 62, mounted over the guide roll 26. By this arrangement the roller 61 bears on the sheet 10 opposite the guide roll 26 and hence its periphery will be driven at the same speed as the sheet moves over the guide roll. By communicating this motion to a traveler either at the same speed or a proportional speed, the traveler can be made to rock the lever 54 (Fig. 7) to the right and thus set the cutter in operation when the desired length of sheet has been fed. As shown, the shaft 62 is equipped with a worm 63 driving a worm gear 64, on a shaft 65, mounted in bearings 66, carried by the frame 21. Near the right end of the shaft in Fig. 6 it is equipped with a loose pinion 67 (see also Fig. 9) meshing with a rack 68 on the lower surface of a traveler 69 having wheels 70 (Fig. 7) running on the ways 71 carried by uprights 72 on the frame 21. The front, or right end of the traveler 69 in Fig. 7, is equipped with a pin 73 adapted to strike the lever 54 with the results above indicated.

It will be obvious that the roller 61, or any roller or shaft driven simultaneously with the movement of the sheet and in any desired proportion thereto may, through this or other mechanism, be made to operate the lever mechanism, or other equivalent structure, for setting the cutter in operation at the desired time.

Referring now to Figs. 6, 7, 8 and 9, and particularly the latter, it will be seen that the right end of the shaft 65 has a disk 74 keyed to it and on the left of the disc is a ratchet wheel 75 fixed with respect to the pinion 67 and adapted to be driven by a pawl 76 pivotally mounted on the disk 74 at 87.

Mounted on the hub 77 (Fig. 9) of the disk 74 is a second disk 78 provided with an arcuate slot 79 (Figs. 7 and 8) through which a pin 80, carried by the disk 74 projects. An arm 81 pivoted at 82 on the disk 78 has its intermediate portion fixed to the pin 80, and a pin 83 carried by the opposite end of the arm 81 is engaged with a spring 84 extending between the pin and a pin 85 on the hub 77 of the disk 74.

The pawl 76 (Fig. 8) has an arm 86 projecting to the right in that figure from the fulcrum 87 of the pawl and equipped with a pin 88 projecting into a cam slot 89 in the disk 78.

The periphery of the disk 78 has teeth 90 adapted to engage the toe 91 on a bell crank 92 fulcrumed on the frame at 93 and connected by a link 94 with the lever 54. Preferably the connection is made by slidably mounting the end of the link 94 in a pivoted stud 95 on the arm and providing an adjustable nut 96 for engagement with the stud.

As the traveler 69 reaches the end of its movement to the right, the lever 54 acting through the link 94 will engage the toe 91 with the teeth 90, of the disk 78, stopping that disk. The disk 74, however, will continue to rotate and move the pin 88 along the slot 89 until the cam action of the latter disengages the pawl 76 from the ratchet 75. This has the effect of disengaging the pinion 67 from the shaft 65, and permitting the traveler 69 to stop.

A counterweight 97 (Fig. 7) attached to a cord 98 running over a pulley 99 and attached to the left end of the traveler at 100 (Fig. 7) will immediately bring that traveler back to the starting point, as indicated in Fig. 7.

The length of sheet to be fed before the cutter is operated automatically may be adjusted by adjusting the stop 101 (Fig. 7) which limits the leftward movement of the traveler 69. As shown, this stop is carried by a screw 102 mounted in a nut 103 on the frame and equipped with a handle 104.

When the cutter has been operated to sever the sheet the feed should be checked to give an opportunity for removing the roll from the cylinder 20. This may be accomplished in a number of ways, one of which is illustrated particularly in Figs. 2 and 5. The shaft 105 of the lower pull roll 18 is extended to the left in Fig. 2 and equipped with a loose pulley 106 adapted to be engaged with the shaft by a clutch 107 of any suitable form. That illustrated is well known and need not be described in detail. The clutch is operated by a fork 108, fulcrumed at 109 (Fig. 7) on an arm 110, carried by the frame 21. A link 111 pivoted to the fork adjacent to its head is also pivotally connected with one arm 112 of the bell crank, fulcrumed at 113 on the frame and having another arm 114 connected by a link 115 with a lever 116 (Fig. 5), fulcrumed at 117 and lying in the path of an arm 118 on the shaft 32 of the cutter roll 22. Hence, as the cutter roll revolves the arm 118 will engage the lever 116 and through the intermediate mechanism disengage the clutch 107.

Preferably, as shown, the arm 118 is equipped with rollers 119 to reduce the friction against the lever 116.

It will also be advantageous to apply a brake to the pull rolls and this may be done by the mechanism connected with the clutch operating mechanism, or otherwise operated in timed relation with the release of the clutch. As shown particularly in Figs. 6 and 7, the brake is operated by an arm 120 on the clutch fork 108, the lower end of which is connected by a link 121 with an arm 122 on a shaft 123, rotatably mounted in bearings 124 adjacent to the bottom of the frame. This shaft has another arm 125 connected by a link 126 with one arm 127 of a bell crank fulcrumed at 128, and having another arm 157 connected by a link 158 with one arm 159 of a bell crank fulcrumed at 160 and having another arm 129 connected by a link 130 with a lever 131 (Fig. 6) operating a brake band 132 on a pulley 133, fixed to the shaft 105 of the lower pull roll 18. The arm 129 and link 130 form a toggle which, when straight, holds the brake released and when bent serves to apply the brake. The lever 131 is extended (Fig. 6) and equipped with a counterweight 134 to assist in applying the brake quickly after the toggle is bent.

The shaft 123 is equipped with pedals 135 and 136 (Fig. 6) whereby the feed clutch may be engaged or disengaged and the brake on the feed may be applied or released manually.

The roll forming mechanism 20 may be of any suitable form and is here shown of conventional structure including a split cylinder, one half 137, is fixed to rotate with a shaft 138, driven by a pulley 139 through a clutch 140.

The other half 141, of the roll forming cylinder is mounted on the first half by a plurality of pivoted links 142 and a spring 143 serves to normally hold the two parts of the cylinder in the relation illustrated in Figs. 3 and 6.

The end of the strip is inserted in the slot 144 between the two halves and is gripped in the rotation of the cylinder, and the strip is thus made to roll about its surface.

In order to facilitate the removal of the finished roll the cylinder is collapsed by shifting the half 141 to the left in Fig. 3. This is accomplished by a fork 145 fulcrumed at 146 (Fig. 6) and operated by a lever 147 fulcrumed at 148. The fork 145 operates a pusher 149 (Fig. 4) which has a rod 150 adapted to bear against a bracket 151 mounted on the half cylinder 141. Thus, when the pusher is moved to the left in Fig. 4 the half cylinder 141 will be shifted to the left against the resistance of the spring 143 and approach the half cylinder 137 relieving the friction between the cylinder and the roll and facilitating the removal of the latter.

*General operation*

The sheet 10 is drawn from the finished loop 17, or other suitable source of supply, by the pull rolls 18 and fed through the cutter 22 to the roll forming device 20. In passing over the guide roll 26 the sheet drives the measuring roll 61 which, through the shaft 65, the pinion 67, and the rack 68, moves the traveler 69 to the right in Fig. 7. The starting point of the traveler having been adjusted by the hand wheel 104 to make the pin 73 on the traveler rock the lever 54 a sufficient amount to shift the arm 45 (Fig. 6) and release the cutter clutch when a predetermined amount of sheet has been fed. The cutter then is engaged with the pulley and rotated to cut the sheet.

The lever 54, through the link 94, has stopped the rotation of the disk 78, and the continued rotation of the disk 74 has released the pawl 76 from the ratchet 75, and the counterweight 97 has returned the traveler to normal position, shown in Fig. 7. The relative movement of the disks 78 and 74 has moved the pin 80 to the left in Fig. 8 until the spring 84 has been moved past the pivot 82 when the link 81 has snapped to the left.

As the cutter roll rotates the arm 118 (Fig. 5) strikes the lever 116 and, through the intermediate mechanism, releases the clutch 107. It also operates through the shaft 123 and connected mechanism to apply the brake 132. The operator leans against lever 147, collapses the roll forming cylinder, and removes the roll.

In the meantime the return of the traveler has permitted the lever 54 to resume the normal position shown in Fig. 7, thereby placing the arm 45 in position to disengage the cutter clutch at the end of one revolution.

The operator then throws the arm 81 over to the right, as shown in Fig. 8, engaging the pawl 76 with the ratchet 75, and steps on the treadle 135 thereby releasing the brake 132 and engaging the clutch 107.

Should it be desired to stop the machine before the predetermined length has been fed this may be accomplished by a hand lever 152 (Figs. 8 and 9) pivoted at the right end of the shaft 65 and equipped with a pawl 153 weighted at its right end 154 to make it normally engage the teeth 90 on the disk 78. This hand lever 152 normally hangs in the position shown in Fig. 8, and a cam 155 serves to support the pawl 153 in released position by engagement with a roller 156 thereon.

It will be obvious to those familiar with this type of machine that the structure illustrated will permit existing machines to be readily modified to accomplish the objects of this invention. It will also be obvious that in building new machines the principles of the invention can be embodied in a more compact organization.

I claim as my invention:

1. In a machine of the class described, roll forming mechanism, a cutter, means for feeding a continuous sheet past the latter, a measuring device driven by the sheet, means operated by the measuring device for setting the cutter in operation, and other means actuated by the cutter for stopping the feeding of the sheet.

2. In a machine of the class described, a cutter, driving means for the cutter including a clutch, sheet feeding means, driving means for the sheet feeding means including a clutch, and means operated by the movement of the sheet to engage the first clutch and other means actuated by the cutter to release the second clutch.

3. In a machine of the class described, sheet feeding means, driving mechanism therefor including a clutch, a cutter, driving mechanism for the cutter including a clutch, separate lever mechanisms controlling the clutches, a measuring device including means moved by and in proportion to the feed of the sheet to operate the lever mechanism of the cutter clutch when a predetermined length of sheet is fed, whereby the cutter is operated to sever the sheet, and means actuated by the cutter to operate the other lever mechanism to stop the sheet feeding means after the cutter is set in operation.

4. In a machine of the class described, means for feeding a sheet, a cutter, means for driving the sheet feeding means and the cutter, lever mechanism for controlling said driving means, an automatic means for operating said lever mechanism when a predetermined length of sheet has been fed including a roller driven by the sheet, a shaft driven by the roller, and an endwise movable traveler bar driven by the shaft and having a trip acting directly on the lever mechanism.

5. In a machine of the class described, means for feeding a sheet, a cutter, means for driving the sheet feeding means and the cutter, lever mechanism for controlling said driving means, an automatic means for operating said lever mechanism when a predetermined length of sheet has been fed, a roller driven by the sheet, and an endwise movable traveler bar driven by the roller and having a trip portion operating on said lever mechanism.

6. In a machine of the class described, means for feeding a sheet, a cutter, means for driving the sheet feeding means and the cutter, lever mechanism for controlling said driving means, an automatic means for operating said lever mechanism when a predetermined length of sheet has been fed, a roller driven by said sheet, a shaft driven by the roller, a pinion driven by the shaft, a rack driven by the pinion and a traveler carried by the rack and acting on the lever mechanism.

7. In a machine of the class described, means for feeding a sheet, a cutter, means for driving the sheet feeding means and the cutter, lever mechanism for controlling said driving means, an automatic means for operating said lever mechanism when a predetermined length of sheet has been fed, a roller driven by said sheet, a shaft driven by the roller, a pinion driven by the shaft, a rack driven by the pinion and a traveler carried by the rack and acting on the lever mechanism, and means for releasing the pinion from the shaft when the lever mechanism is operated.

8. In a machine of the class described, roll forming mechanism, a cutter, means for feeding a continuous sheet past the cutter, a measuring device actuated directly by the sheet and including an endwise movable traveler bar moving transverse to the sheet, and means operated by the traveler bar for setting the cutter in operation.

9. In a machine of the class described, roll forming mechanism, a cutter, means for feeding a continuous sheet past the cutter, a measuring device including a traveler, means operated by the traveler for setting the cutter in operation, means for driving the traveler including a clutch, means for releasing the clutch when the traveler sets the cutter in operation, and means for returning the traveler.

10. In a machine of the class described, sheet feeding means comprising a plurality of rollers on axes transverse to the sheet, a cutter comprising a knife roller transverse to the sheet, means for actuating the cutter through a definite cycle, roll forming mechanism and a measuring device actuated directly by the sheet and including an endwise movable traveler bar moving in timed relation to the sheet for initiating the operation of the cutter actuating means and setting the cutter in operation.

11. In a machine of the class described, sheet feeding means including a driving shaft and a feed clutch, a cutter including a shaft and a cutter clutch, roll forming mechanism, and independent means for controlling the respective clutches, one of said means including an endwise movable traveler bar moving in timed relation to the sheet.

12. In a machine of the class described, sheet feeding mechanism including a driving shaft and a feed clutch, a brake for the driving shaft, a cutter including a shaft and a cutter clutch, roll forming mechanism and independent means for controlling the respective clutches and said brake, the cutter clutch controlling means including an endwise movable traveler bar moving in timed relation to the sheet.

13. In a machine of the class described, roll forming mechanism, sheet feeding mechanism including a shaft and a feed clutch, a cutter, a cutter clutch, measuring means operating in timed relation to the sheet feed for actuating the cutter clutch and setting the cutter in operation, and means operated by the cutter for releasing the feed clutch.

14. In a machine of the class described, roll forming mechanism, sheet feeding mechanism including a shaft and a feed clutch, a feed brake, a cutter, a cutter clutch measuring means operating in timed relation to the sheet feed for actuating the cutter clutch and setting the cutter in operation, and means operated by the cutter for releasing the feed clutch and applying the feed brake.

15. In a machine of the class described, roll forming mechanism, sheet feeding means including a driving shaft and a feed clutch, a cutter including a driving shaft and a cutter clutch constantly tending to engage, control means for holding the cutter clutch released, means operated by the cutter for releasing the feed clutch and a device driven by and in timed relation to the sheet for shifting the control means out of engagmeent with the cutter shaft.

16. In a machine of the class described, roll forming mechanism, sheet feeding mechanism including a driving shaft and a feed clutch, a feed brake, a cutter including a driving shaft and a cutter clutch constantly tending to engage, control means for holding the cutter clutch released, means operated by the cutter for releasing the feed clutch and applying the feed brake, and a device driven by and in timed relation to the sheet for actuating the control means for shifting the cutter clutch into engagement with the cutter shaft.

17. In a machine of the class described, roll forming mechanism, sheet feeding mechanism, a cutter located between said mechanisms and including a driving shaft and a cutter clutch constantly tending to engage, control means restraining the cutter clutch, and means including an endwise movable traveler bar moving in timed relation to the sheet for actuating the control means to engage the cutter clutch with the cutter driving shaft.

18. In a machine of the class described, sheet feeding mechanism including a driving shaft and a feed clutch, a cutter including a shaft and a cutter clutch, roll forming mechanism, and independent means for controlling said respective clutches, the means for controlling the cutter clutch including an endwise movable traveler bar moving in timed relation with the sheet, and manually operated means for controlling the feed clutch.

19. In a machine of the class described, sheet feeding mechanism including a driving shaft and a feed clutch, a feed brake, a cutter including a driving shaft and a cutter clutch, roll forming mechanism, a measuring device including an endwise movable traveler bar moving in timed relation to the sheet for engaging the cutter clutch and manually operated means for releasing the feed brake and engaging the feed clutch.

In testimony whereof I affix my signature.

ALBERT E. F. MOONE.